(12) United States Patent
Sixsmith et al.

(10) Patent No.: US 9,664,324 B2
(45) Date of Patent: May 30, 2017

(54) CONTAINMENT PIPE FITTINGS AND METHODS

(75) Inventors: Thomas G. Sixsmith, Lake Forest, CA (US); Paul F. Mastro, Little Rock, AR (US); Christopher J. Stvartak, Charleston, IL (US)

(73) Assignee: Georg Fischer LLC, Tustin, CA (US)

( * ) Notice: Subject to any disclaimer, the term of this patent is extended or adjusted under 35 U.S.C. 154(b) by 963 days.

(21) Appl. No.: 13/516,040

(22) PCT Filed: Dec. 14, 2010

(86) PCT No.: PCT/IB2010/003245
§ 371 (c)(1),
(2), (4) Date: Jun. 14, 2012

(87) PCT Pub. No.: WO2011/073770
PCT Pub. Date: Jun. 23, 2011

(65) Prior Publication Data
US 2012/0248761 A1    Oct. 4, 2012

Related U.S. Application Data

(60) Provisional application No. 61/286,545, filed on Dec. 15, 2009.

(51) Int. Cl.
*F16L 47/02* (2006.01)
*F16L 7/00* (2006.01)
(Continued)

(52) U.S. Cl.
CPC ............ *F16L 47/02* (2013.01); *F16L 7/00* (2013.01); *F16L 25/12* (2013.01); *F16L 39/005* (2013.01); *F16L 43/008* (2013.01); *F16L 47/32* (2013.01)

(58) Field of Classification Search
CPC ......... F16L 47/02; F16L 39/005; F16L 47/32; F16L 7/00; F16L 43/008; F16L 25/12
(Continued)

(56) References Cited

U.S. PATENT DOCUMENTS 266,860 A * 10/1882 Browell ..................... 5/164.1
916,122 A *  3/1909 Doyle ......................... 152/70
(Continued)

FOREIGN PATENT DOCUMENTS

DE    20315084 U1   12/2003
FR      939602 A    11/1948

OTHER PUBLICATIONS

International Search Report and Written Opinion for PCT/IB2010/003245, dated Jun. 6, 2011.

*Primary Examiner* — David E Bochna
(74) *Attorney, Agent, or Firm* — Bachman & LaPointe, P.C.

(57) ABSTRACT

A containment pipe fitting has an inner member (40; 260), an outer member (42; 262), and a plurality of centralizers (48) positioning the inner member within the outer member. The fitting has at least one connection interface (37; 38; 39; 254; 255) having an internal surface portion (72) of the inner member sized to receive and join a portion of an associated inner/main pipe (31; 32; 33) and an internal surface portion (80) of the outer member sized to receive and join the portion of an associated outer/containment pipe (34; 35; 36). The connection interface further includes an external surface portion of the outer member dimensioned to receive a closure coupling or collar (100; 100').

4 Claims, 9 Drawing Sheets

(51) Int. Cl.
 *F16L 25/12* (2006.01)
 *F16L 39/00* (2006.01)
 *F16L 43/00* (2006.01)
 *F16L 47/32* (2006.01)

(58) Field of Classification Search
 USPC .............................. 285/123.3; 138/122, 114
 See application file for complete search history.

(56) References Cited

U.S. PATENT DOCUMENTS

| | | | | |
|---|---|---|---|---|
| D52,687 | S | * | 11/1918 | West .......................... D12/211 |
| 5,259,651 | A | | 11/1993 | Sharp |
| 5,400,828 | A | * | 3/1995 | Ziu .......................... F16L 7/00 |
| | | | | 138/111 |
| 5,624,140 | A | * | 4/1997 | Allen et al. ................ 285/123.1 |
| 6,139,040 | A | * | 10/2000 | Dempsey ................... 280/288.3 |
| 2004/0207197 | A1 | | 10/2004 | Hoang et al. |
| 2006/0157972 | A1 | | 7/2006 | Catton |
| 2007/0272318 | A1 | * | 11/2007 | Hoffhaus .................. F27D 3/18 |
| | | | | 138/108 |

\* cited by examiner

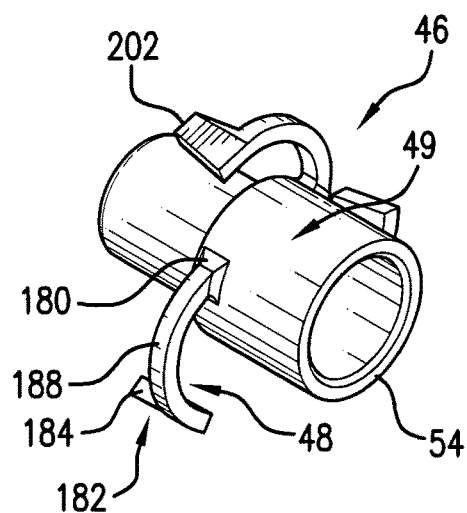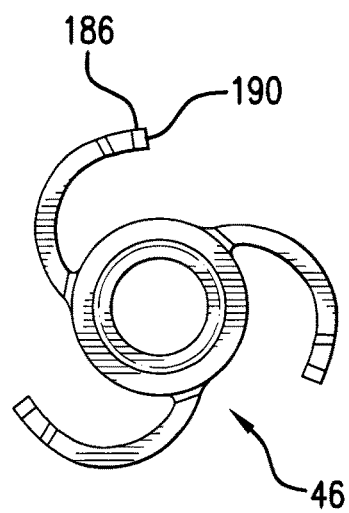
FIG.2  FIG.3
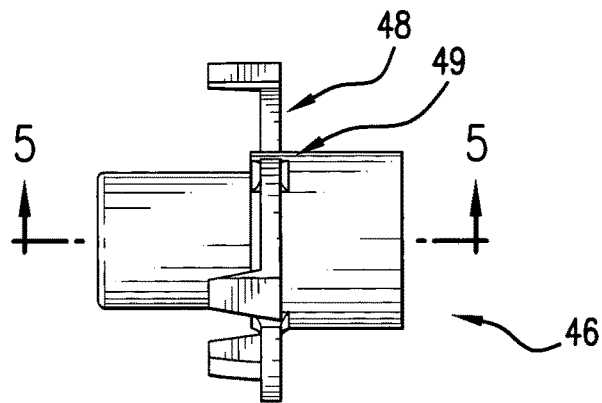
FIG.4
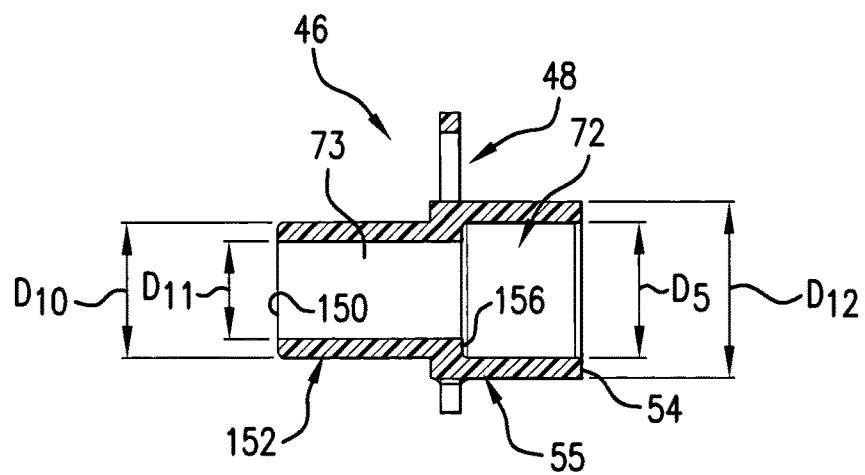
FIG.5

CONTAINMENT PIPE FITTINGS AND METHODS

CROSS-REFERENCE TO RELATED APPLICATION

Benefit is claimed of U.S. patent application Ser. No. 61/286,545, filed Dec. 15, 2009, and entitled "Containment Pipe Fittings and Methods", the disclosure of which is incorporated by reference herein in its entirety as if set forth at length.

BACKGROUND

The invention pertains to plastic piping. More particularly, the invention pertains to secondary containment piping systems.

Secondary containment systems are either required by law or installed by end users to protect against accidental discharge of hazardous chemicals into the environment or to protect against personal injury. Secondary containment comprises an outer or containment pipe that surrounds the inner or primary fluid carrying pipe. Secondary containment systems can be either buried or above ground, pressure or drainage, and usually have some type of detection scheme to detect for any leaks. The most common systems in use today are joined by solvent cement with a much smaller percentage joined by heat fusion (for polyolefin materials). Most systems are sold with a standard pressure rating on the inner pipe and limited pressure rating for outside pipe (0.3 Bar is common). A common legal requirement is for these systems to contain a leaking fluid for up to seventy-two hours until a repair can be made.

An exemplary solvent cement containment piping system is made by utilizing existing molded pipe fittings; inserting a smaller inner fitting (tee, elbow etc.) within a larger outer fitting and providing a "centralizer" to support the two. Similarly, secondary containment pipes are made by inserting a smaller inner/main pipe within a larger outer/containment pipe and providing centralizers for support. Joining the pipes to the fittings has always been the most difficult task. Existing systems require a considerable number of simultaneous solvent-cemented joints for a typical installation. Typical solvent cementing requires: the application of a primer to both mating surfaces; then application of the cement to both surfaces (most times two applications of cement to the fitting side); then quickly joining the mating parts (applying a quarter turn in the process); and then holding the parts in place (thirty seconds to a minute) until the cement sets up.

Understandably, this process is even more difficult to accomplish when attempting to do an inner and outer joint at the same time. There are twice the number of surfaces that must be prepared, the inner pipe needs to be fixed to the containment pipe to ensure complete socket insertion. Also, the inner joint is being done "blind". Other deficits of existing systems are inability to inspect the inner joint during pressure testing and, should a leak occur, difficulty locating and repairing a failed joint.

Existing systems provide "closure couplings" that are intended to be used at each of the final pipe segment joints. Exemplary closure couplings have two special coupling halves (with no internal pipe stops) which have a tapered male/female interface. One coupling half seals the outside of the containment pipe and the mating side is intended to slide over the gap area and seal the other pipe and the male/female interface of the coupling.

SUMMARY

One aspect of the invention involves a method for installing a fitting in a containment piping system. A closure collar is slid over a first outer pipe. A first end portion of a first inner pipe which protrudes beyond a first end of the first outer part is mated and secured to an inner member of the fitting to form a first inner joint. The closure collar is slid to mate with an outer member of the fitting. The closure collar is secured to the outer member and to the first outer pipe to form a first outer joint.

In various implementations, the method may further include pressure testing the first inner joint before the securing of the closure collar. The securings may comprise at least one of adhesive bonding and solvent cementing. The fitting may be a tee fitting where second and/or third combinations of inner and outer joints may be similarly formed. The pipes and fitting components may be non-metallic.

Another aspect of the invention involves a containment pipe fitting for use in a containment pipe system. The system has one or more inner pipes of an inner pipe outer diameter (OD). The system has one or more outer pipes respectively associated with the inner pipes and concentrically surrounding the inner pipes and having an outer pipe OD. The fitting may comprise an inner member and an outer member. A plurality of centralizers may position the inner member within the outer member. The fitting has at least one connection interface comprising an internal surface portion of the inner member sized to receive and join a portion of an associated said inner pipe. The connection interface further includes an internal surface portion of the outer member sized to receive and join a portion of an associated said outer pipe. The connection interface further comprises an external surface portion of the outer member dimensioned to receive a closure coupling.

In various implementations, at the connection interface, the inner member may be within plus/minus five percent of the outer pipe OD of flush to the outer member. The outer member may bear an external pipe cutting guide indicia. The connection interface may be a first connection interface and the fitting may comprise a second connection interface. The outer member may comprise a single piece extending from the first connection interface to the second connection interface. The inner member may comprise a first piece extending from the first connection interface, a second piece extending from the second connection interface, and a central main piece connecting the first piece to the second piece. The fitting may further comprise a third connection interface. The outer member single piece may extend to the third connection interface. The inner member may have a third piece extending from the third connection interface to the inner member main piece. The connection interfaces may be essentially identical. The exterior end surface portion at the connection interface may comprise a plurality of annular ridges.

Another aspect of the invention involves a centralizer for a containment piping system. The centralizer comprises a socket adapter having a first rim at a first end. The centralizer has a second rim at a second end. An inner surface extends between the first and second ends. An outer surface extends between the first and second ends. A plurality of arms extend radially outward from the socket adapter.

In various implementations, the socket adapter and plurality of arms may be unitarily-formed as a single molded piece. The inner surface may define a socket extending from the first rim and having a socket inner diameter. Along the socket, the outer surface may have a socket outer diameter. Along a portion between the second rim and the socket, the inner surface may have a second inner diameter less than the socket inner diameter. Along a portion extending from the second end, the outer surface may be radially recessed with a second outer diameter less than the socket outer diameter. For example, the socket may be complementary to a portion adjacent the second rim. The centralizer arms may have free distal ends. The arms may spiral. The arms may have longitudinally protruding end portions.

Another aspect of the invention involves a closure coupling. The closure coupling comprises a first end, a second end, an inner surface, and an outer surface. Along a portion proximate the second end, the inner surface may be dimensioned to mate with the outer surface of a pipe. Along a first portion proximate the first end, the inner surface is larger than along the second portion. In various implementations, along the second portion, from axially inboard to axially outboard, the inner surface may have a series of ridges of progressively smaller diameter. Along the first end portion, the inner surface may have a generally outwardly divergent taper with one or more grooves extending radially outward therefrom.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is a view of a centralizer of the fitting of FIG. 1.
FIG. 3 is an end view of the centralizer of FIG. 2.
FIG. 4 is a side view of the centralizer of FIG. 2.
FIG. 5 is an axial sectional view of the centralizer of FIG. 4.

Like reference numbers and designations in the various drawings indicate like elements.

DETAILED DESCRIPTION

Figure 1:
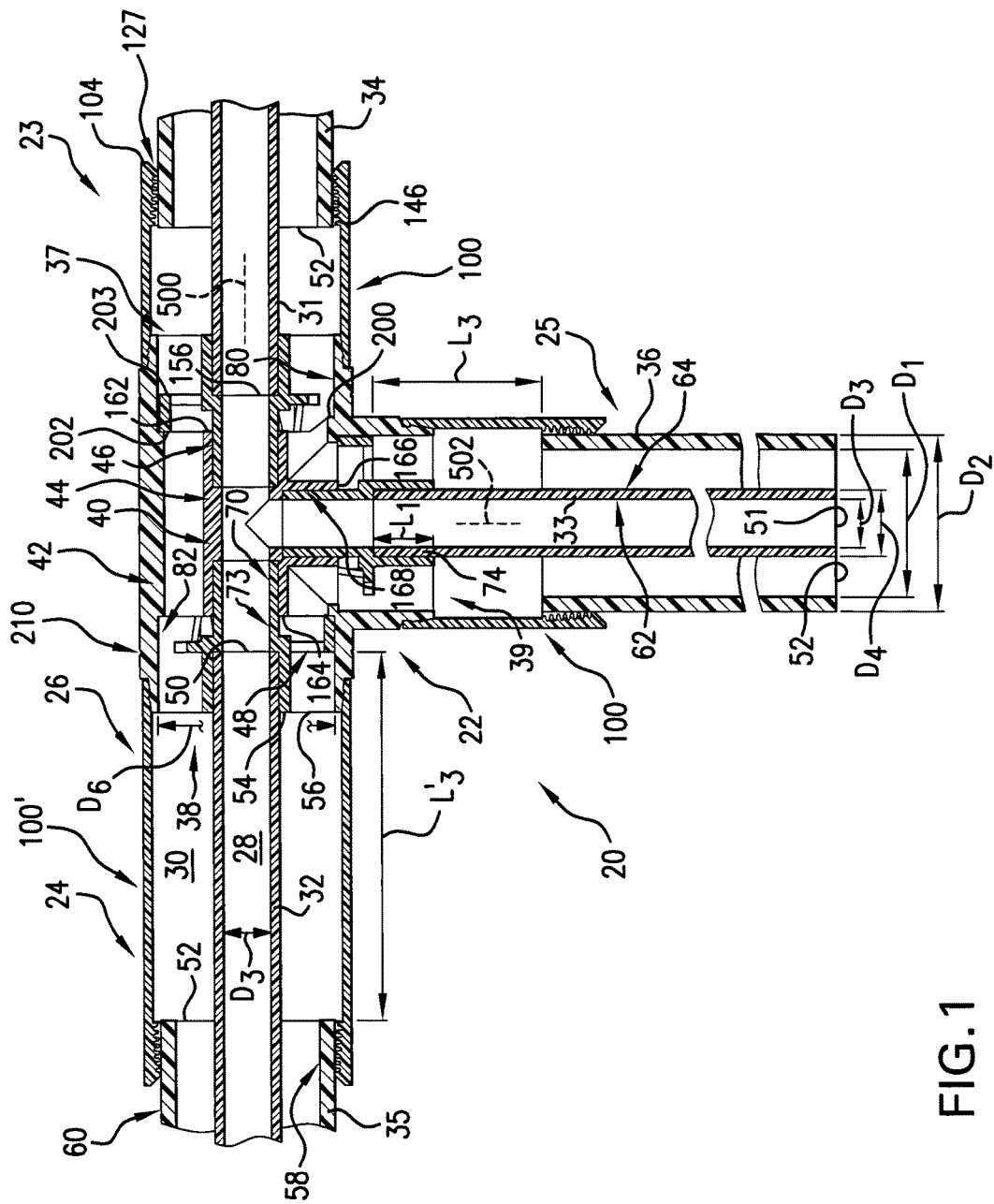
FIG. 1 is a partial axial sectional view of a tee fitting in a containment piping system.

FIG. 1 shows a secondary containment piping system 20 including a fitting 22. The exemplary fitting 22 is a T-fitting (tee), although other fittings may be similarly constructed. The exemplary fitting 22 couples a first branch 23, a second branch 24, and a third branch 25 (the exemplary third branch being the leg (or trunk/shaft) of the tee and the exemplary first and second branches being the respective arms (or head) of the tee along a main line 26). The exemplary branches 23 and 24 are coaxial along a main line axis 500; whereas the third branch 25 has a central longitudinal axis/centerline 502 orthogonal thereto.

The system 20 has a main or inner space/flowpath 28 and a containment or outer space/flowpath 30 surrounding the inner flowpath. Along the respective first, second, and third branches, the main flowpath is bounded/within respective first, second, and third main pipe segments 31, 32, and 33. Similarly, the exemplary containment space is the annular space radially between the main pipe segment and an associated first, second, and third containment pipe segment 34, 35, and 36. At the exemplary first branch, the first main pipe segment 31 and first containment pipe segment 32 join a first connection interface 37 of the fitting 22. Similarly, the second main pipe segment and second containment pipe segment join a second connection interface 38 and the third main pipe segment and third containment pipe segment join a third connection interface 39.

The exemplary fitting 22 includes an inner member or element 40 and an outer member or element 42. The exemplary inner member is formed as an assembly of separately molded pieces: a main piece 44; and a plurality of terminal pieces 46 (shown alone in FIGS. 2-5). The exemplary outer member 42 is formed as a single-piece unitary molding (shown alone in FIG. 7). As is discussed further below, the inner member 40 may be maintained in position within the outer member 42 by a plurality of centralizers. The exemplary centralizers are formed by the terminal pieces 46. Each of the exemplary centralizers is formed with a group of radially-extending arms 48 (see also FIGS. 2-5 showing a three-armed centralizer) extending from a main body 49 of an associated such terminal piece 46. Each of the centralizers may alternatively be formed separately (e.g., as its own unitary single piece molding separate from the main body 49).

Each of the main pipe segments includes a proximal first end/rim 50. A second end 51 may be relatively remote of the fitting (e.g., coupled to another fitting). Similarly, each of the containment pipe segments has a proximal first end 52 and a remote distal end (53). Thus, when a given main pipe segment and containment pipe segment connect to such fittings, the "second" ends of such segments could function relative to one of the associated fittings as the "first" ends do to the other. Thus, the designations of "first" and "second" ends should not be treated as limiting. Similarly, the "first" main and containment pipe segments as applied to one fitting as described above may be positioned relative to another fitting as are either the "second" main and containment pipe segments or the "third" main and containment pipe segments relative to the first such fitting.

At each of the connection interfaces, the inner member 40 has a rim 54 (FIG. 1) (e.g., of a first end portion 55 (FIG. 5)). The exemplary rim 54 is formed by a distal/outboard rim of the associated terminal piece 46. Similarly, the outer member 42 has a rim 56. The exemplary main pipe segments and containment pipe segments are of stock diameter. The main pipe segments have an inner (interior) surface 58 defining a main pipe inner diameter (ID) $D_1$. Similarly, the main pipe outer (exterior) surface 60 defines a main pipe outer diameter $D_2$. Similarly, the containment pipe segment inner surface 62 and outer surface 64 define respective containment pipe ID and OD of $D_3$ and $D_4$. An exemplary pair of nominal United States (English) sizes of the main pipe and the containment pipe is one-inch & three-inch (1×3). Other English size combinations include: one-half×2; three-quarter×3; inch-and-a-half×4; 2×4; 3×6; 4×8; and 6×10. Exemplary European size combinations are: 20 mm & 63 mm (20×63); 25×90; 32×90; 50×110; 63×110; 90×160; 110× 200; and 160×250.

At each connection interface, the inner member inner surface 70 includes a socket 72 (FIG. 5) extending from the rim 54 and formed by an annular step having an internal diameter $D_5$ (in the exemplary embodiment this socket is formed by the inner surface 73 of the associated terminal piece). As is discussed further below, $D_5$ is selected so that the socket 72 can matingly receive an adjacent portion 74 (FIG. 1) (the first end portion 74) of the associated inner pipe segment proximate the first end thereof. An exemplary length of the first end portion 74 (which is a length of the axial/longitudinal overlap of the main pipe and socket) is shown as $L_1$.

Figure 7:
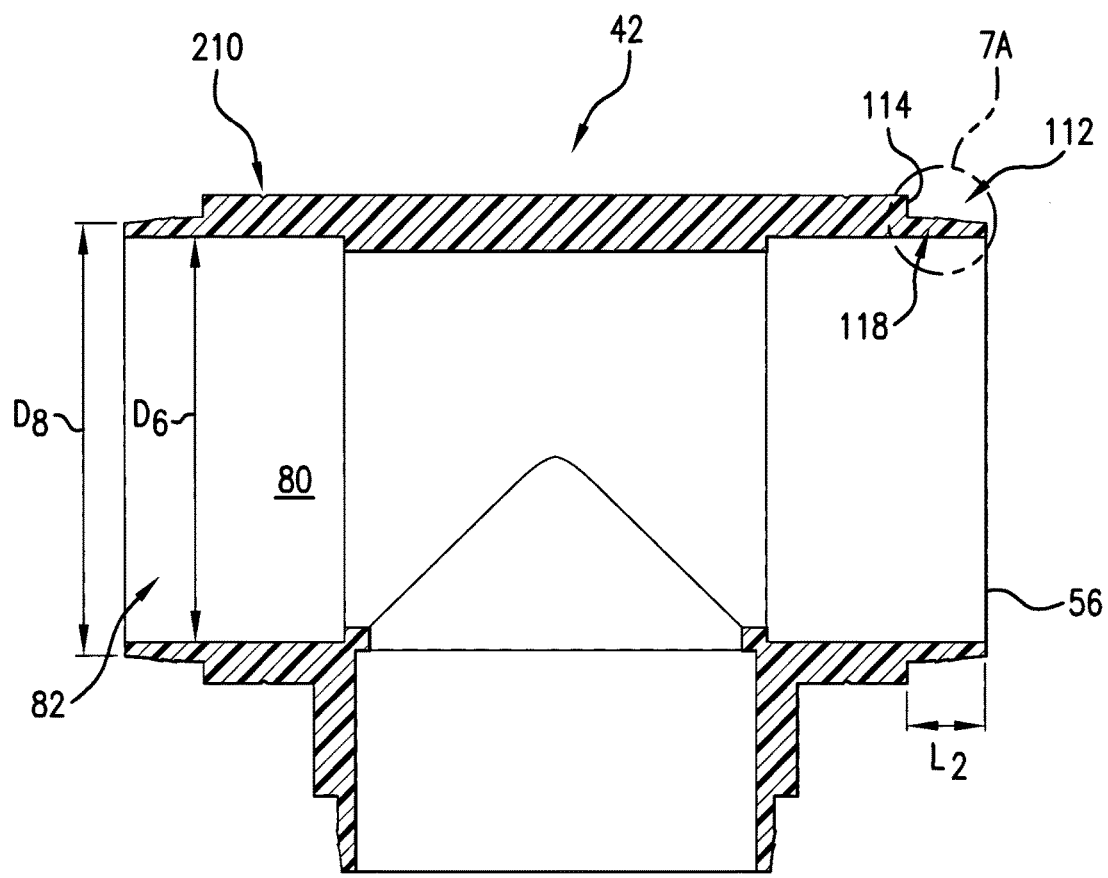
FIG. 7 is an axial sectional view of an outer member of the fitting of FIG. 1.
Figure 12:
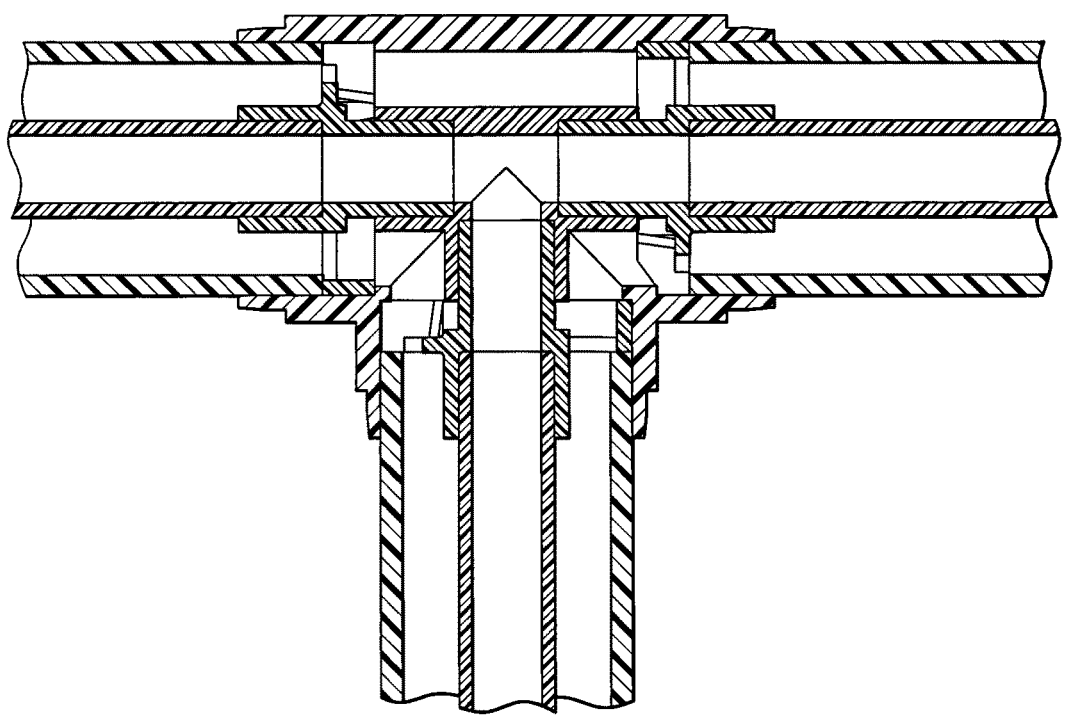
FIG. 12 is a partial view of a tee fitting in a piping system without closure couplings.

As is discussed further below, FIG. 7 shows each connection interface of the outer member as having features for alternatively receiving an end portion of a pipe or being received in an end portion of a closure coupling. This provides the installer with installation options that facilitate inspection of joints involving the main pipes. For direct connection to an outer pipe segment, in the illustrated embodiment, at the connection interface, the outer member inner surface 80 (FIG. 1) may have an inner diameter (ID) $D_6$. $D_6$ may be along a socket 82. As is discussed further below, $D_6$ may be selected to allow the socket to matingly receive an adjacent portion of the associated outer pipe segment proximate the first end thereof (the first end portion-discussed below; e.g., FIG. 12). The exemplary sockets 72 and 82 may, respectively, have dimensions corresponding to standard socket dimensions for the nominal main pipe outer diameter (OD) and containment pipe OD.

The exemplary fitting outer member 42 is configured to alternatively engage the associated containment pipe segment via an associated closure coupling (closure collar) 100 (FIG. 1). The exemplary closure coupling 100 is annular and extends from a first rim/end 102 (FIG. 6) to a second rim/end 104. As is discussed further below, opposite end portions of the closure coupling are respectively configured to receive and mate with an end portion of the outer member and an end portion of a pipe segment. The closure coupling has an inner surface 106 and an outer surface 108. A portion of the closure coupling adjacent the first end 102 is dimensioned to mate with an associated portion of the fitting outer member at the connection interface. Specifically, a portion 105 (FIG. 6B) of the closure coupling inner surface 106 is dimensioned to receive a portion of the fitting outer member 42 outer surface 110. In the exemplary implementation, the fitting outer member outer surface 110 (FIG. 7) has a rebate or relieved area 112 which extends to a shoulder 114 and has an axial length $L_2$. Along the rebate 112, the outer surface 110 has a characteristic OD $D_8$. Along the mating first end portion 116, the closure coupling has an associated characteristic ID $D_7$ (FIG. 6) sufficient to receive the outer member end portion 118 at the rebate. Thus, $L_2$ (FIG. 7) essentially forms the length of the effective closure coupling first end portion 116 and the containment pipe-to-fitting outer member overlap. However, as discussed below, this does not require uniformity of diameter and diameter may be varied for specific purposes.

Figure 6:
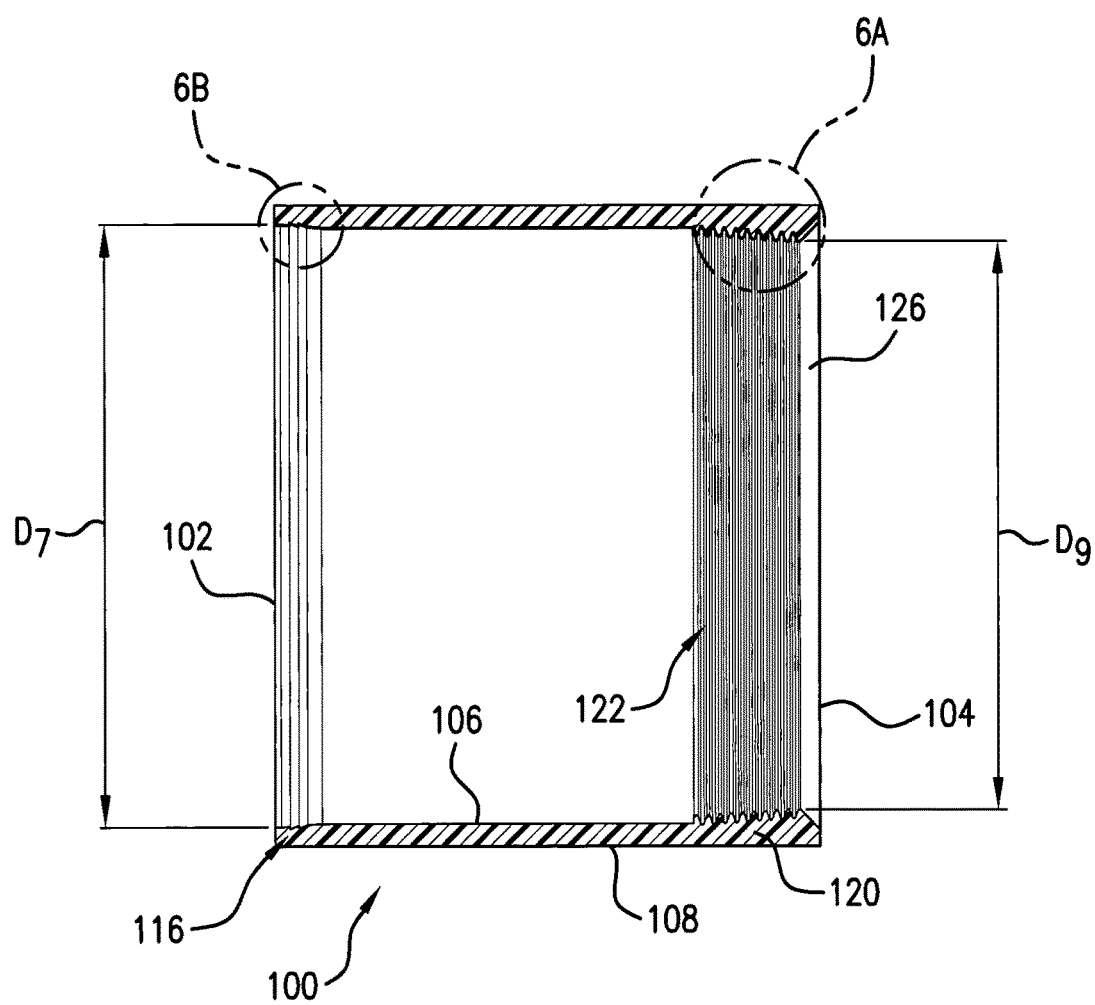
FIG. 6 is an axial sectional view of a closure coupling of the fitting of FIG. 1.
Figures 6A, 6B:
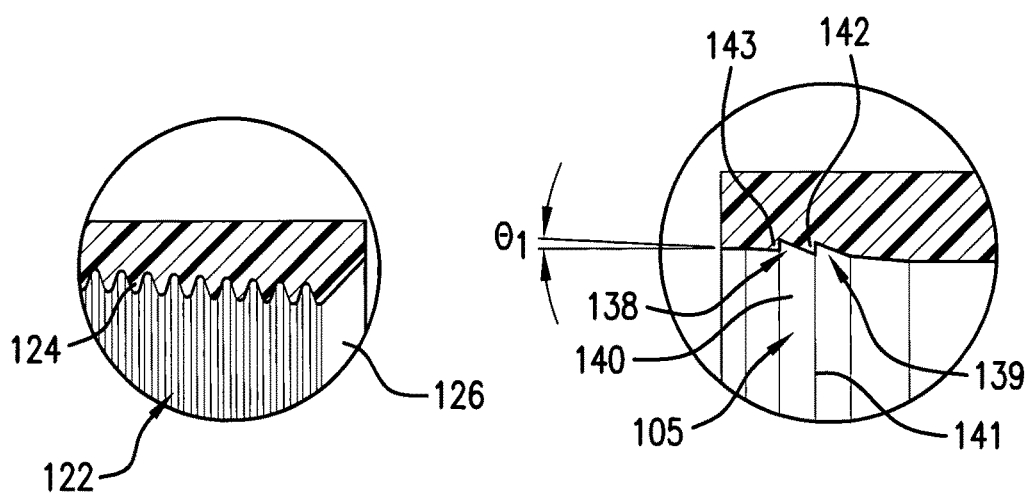

Adjacent the second end 104 (FIG. 6), the closure coupling is dimensioned to receive the outer surface of the containment pipe. Along a second end portion 120, a portion 122 (FIG. 6) of the inner surface 106 has a characteristic ID shown as $D_9$ (FIG. 6). Along the portion 122, the second portion 120 has an array of ridges 124 (FIG. 6A) which taper in ID from axially inboard to axially outboard. The exemplary ID $D_9$ is the ID of the outboardmost ridge. A bevel/taper 126 may form an outboard surface of the outboardmost ridge. This may help guide insertion of the associated pipe. The OD of the associated pipe will be essentially the same as $D_9$ (e.g., just allowing the closure coupling to be slid over a segment of the outer/containment pipe). As is discussed further below, the taper along the ridges helps to engage cement.

Figure 7A:
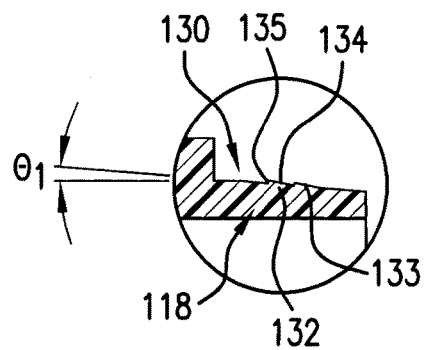

The surface 105 (FIG. 6B) of the closure coupling is generally complementary to the outer surface portion 130 (FIG. 7A) along the rebate. Each may have a general taper at an angle $\theta_1$ (e.g., 4°, more broadly, 3-6°). Along the fitting outer member end portion 118, the surface 130 has a pair of annular barb projections 132 and 133 (e.g., with a relatively sloping/axial leading edge 134 and a relatively radial trailing/engagement edge 135. The closure coupling surface 105 (FIG. 6B) may have channels 138 and 139 complementary to the fitting projections 132 and 133. The channels may have relatively sloping ends 140 and relatively radial ends 141 for respectively engaging the edges 134 and 135 of the associated projections. The channels themselves may effectively define annular inwardly-projecting projections 142 and 143. This allows a snap backlocked engagement. Cementing of both surfaces prior to engagement may provide for a permanent joint.

Similarly, as the closure coupling mates with the outer member, the ridges 124 will sweep the applied cement 146 (FIG. 1) to fill the space between the pipe and closure coupling. However, the joint between the closure coupling and the pipe is particularly subject to defects due to the lack of precision/uniformity in the containment pipe outer surface. Accordingly, the exemplary bevel/taper 126 may be of sufficient size to create a relatively large channel 127 (FIG. 1) at the closure coupling second rim/end 104. In the event of an incomplete or failed joint between the closure coupling and pipe, a bead of a relatively thick cement (e.g., thicker than the cement 146) may be applied to complete the joint.

In some implementations, the fittings may be fully or partially pre-assembled (e.g., at a factory). For example, the outer member and the inner member main piece and terminal pieces may be pre-assembled to each other. In an exemplary sequence of assembly, the inner member main piece 44 is inserted into the outer member 42 (either alone or after attaching to one of the terminal pieces 46). Thereafter, the remaining terminal pieces 46 may be attached. Such attaching may involve conventional adhesive or cement bonding. With all the terminal pieces assembled, the centralizer arms maintain relative position (subject to some permitted flexing) of the inner and outer members both radially and axially/longitudinally. This assembly may be packaged alone or in combination with the associated closure collars. Such a configuration may have several manufacturing advantages. In relatively simple implementations (not shown), it permits the use of stock (e.g., prior art) or near-stock components. In an exemplary tee fitting, the outer member may be a conventional prior art tee fitting of the containment pipe nominal size whereas the inner member main piece may be a conventional prior art tee fitting of the main pipe nominal size. The terminal pieces may comprise conventional prior art socket adapters with a separate centralizer mounted thereto. This permits extensive reuse of conventional prior art components.

Other systems (as illustrated and further discussed below) may make slight changes to the stock (prior art) components. However, these systems may have one or more advantages such as: (1) being easily implemented by (a) only slightly altering molds of conventional prior art components and/or (b) only moderate machining of conventional prior art components; or (2) allowing the modified components to also be used in conventional systems ("backward compatibility"). As one example of backward compatibility, modifications to the outer surface of the outer member 42 to create the rebates 112 still permit use of such a modified outer member as a tee in a non-containment system. Similarly, as a second example of backward compatibility, the modification of the mold of a conventional socket adapter to add the centralizer arms 48 (to a socket adapter which forms the main body 49) still allows use of the modified socket adapter elsewhere in a system (e.g., connect two lengths of main pipe within a single length of containment pipe). Yet greater departures from the prior art are possible.

As is discussed above, the inner element terminal piece 46 (FIG. 5) is based upon a conventional socket adapter modified to add centralizer arms. Its socket 72 extends from the rim 54 (which forms a first (distal) rim of the socket adapter). The socket adapter extends to a second (proximal) rim/end 150. Along a second end portion 152, the outer surface 154 of the terminal piece has a characteristic diameter $D_{10}$ which may be essentially the same as the main pipe OD $D_2$ and smaller than an OD $D_{12}$ along the socket outer surface. The second end portion 152 may have a characteristic ID $D_{11}$ which may essentially extend to a shoulder 156 at the base of the socket. With $D_{10}$ essentially the same as $D_5$, the second end portion 152 can fit into a fitting socket of the nominal main pipe size. Thus, in the exemplary tee fitting, the inner member main piece 44 can be a conventional (prior art) tee fitting of that size. Thus, the exemplary inner member main piece may have respective first, second, and third ends/rims 162, 164, 166 (FIG. 1). From each of these three rims, a socket 168 may extend inward and may have similar geometry to the socket 72.

In the exemplary centralizer (FIG. 2), each of the arms 48 spirals radially/circumferentially outward from a proximal end or root 180 to a distal end 182. The exemplary distal end is formed longitudinally protruding/extending foot 184. The spiral shape of the arms allows the arms to flex to provide a compliant radial excursion of the inner member relative to the outer member. The flex biases the members toward concentricity, but accommodates excursions which may be caused by differential thermal expansion of the inner pipes relative to the outer pipes. The radial extreme 186 of the arm may at the foot or fall near a junction between the foot and a main portion 188 of the arm. The illustrated example of FIG. 3 has the radial extreme 186 at the foot. In alternative embodiments where this radial extreme is along an intermediate portion of the arm, then, circumferentially beyond this location, the arm may spiral slightly radially inward before reaching the circumferential extreme 190 of the arm and foot. This may provide a smooth interface between the arms and the inner surface of the outer member. Similarly, the elongatedness of the foot helps distribute and diminish forces to further minimize wear between the arms and the fitting outer member in use (e.g., wear caused by rubbing due to vibration and expansion/contraction cycles). In the embodiment of FIG. 1, the length of the foot 184 relates to other dimensions of the outer member and of the inner member main element. The exemplary shoulder 200 which forms the base of the socket 82 is axially aligned with the associated rim/end of the inner member main piece. The length and position of the feet are selected so that, when the terminal pieces are installed, the longitudinal ends or tips 202 of the projecting feet abut the shoulder 200. This arrangement allows the centralizers to maintain the relative axial positions of the inner member and outer member (e.g., with compliance provided by axial flex of the arms to accommodate differential expansion or other axial excursion). Thus, the arm flex provides three linear degrees of permitted excursion (two from radial plus one from axial) plus pitch and yaw rotation. The slip of the feet within the outer member permits a roll rotation excursion (but without inherent counterbias). In the exemplary embodiment, an outboard (axially) face 203 of the centralizer is at essentially the same longitudinal position as the associated shoulder 156. As is discussed further below, in situations where a containment pipe is directly inserted into the fitting, this allows the rim 52 of such containment pipe to be axially aligned with the rim 53 of the associated main pipe. As alluded to above, if the outer member is used alone in a non-containment piping system, then an associated pipe may be inserted into each socket 82 with the end of the pipe abutting the shoulder 200.

Figure 8:
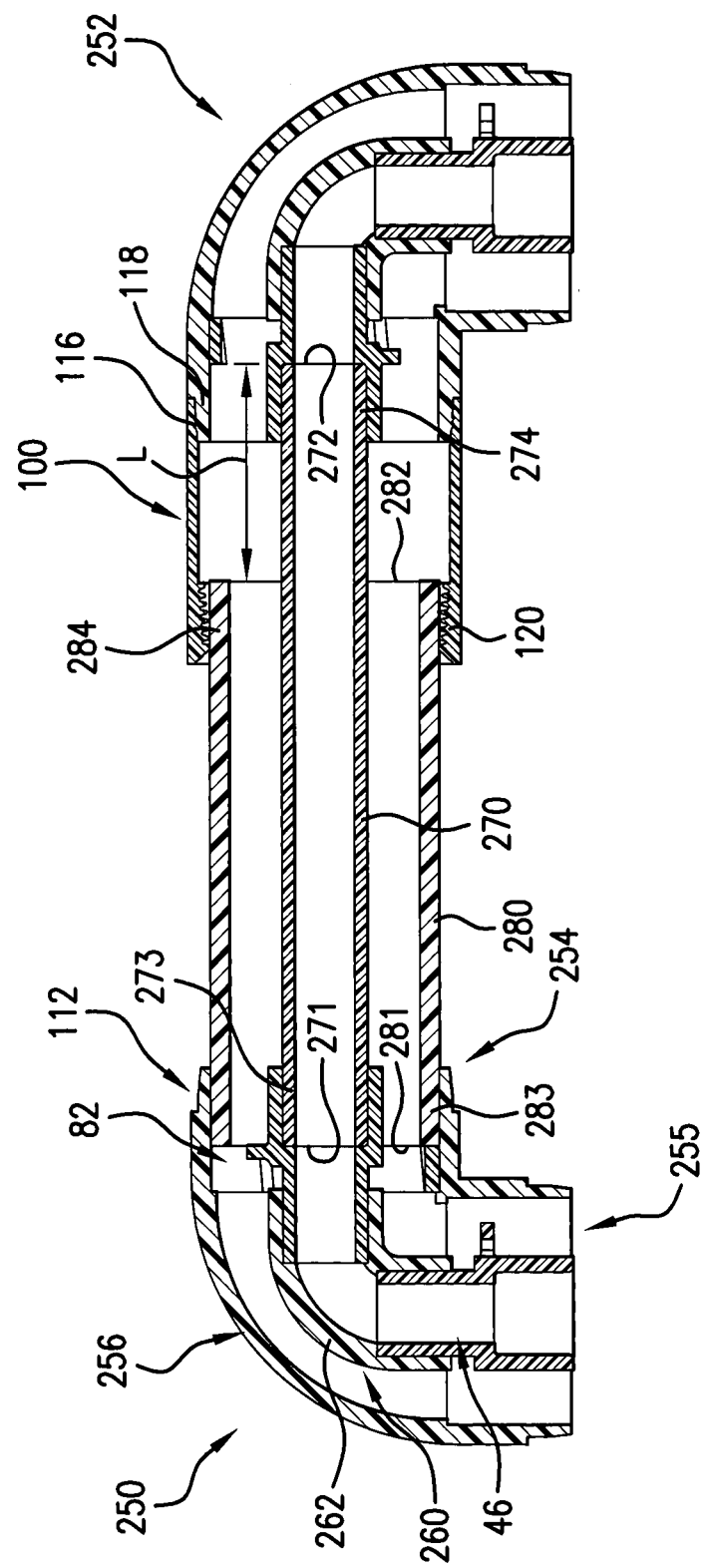
FIG. 8 is a view of a pair of elbow fittings in a piping system.

FIG. 8 shows an assembly including two elbow fittings 250 and 252 which may be identical to each other. Each of the fittings 250, 252 has a first connection interface 254 and a second connection interface 255. In the exemplary 90° elbow, these are at right angles to each other. These connection interfaces are essentially identical to the connection interfaces 37-39. Each of the fittings 250, 252 comprises an outer member or element 256 which may have the same features at the connection interfaces as does the outer member 42 (e.g., sockets 82 and rebates 112). Similarly, the inner member or element 260 may be formed by a main piece 262 and two of the terminal pieces 46. The main piece 262 may have similar sockets to those of the main piece 44. The first connection interfaces 254 of the fittings 250, 252 may be joined along the main flowpath by an inner pipe 270 extending between a first end 271 and a second end 272 having associated first and second end portions 273 and 274 engaged to the respective terminal piece sockets of such interfaces.

The outer members 256 are connected by the exemplary combination of a pipe 280 and a single closure coupling 100. As is discussed further below, such fittings might alternatively be connected by a piping combination with two such closure couplings or merely by a pipe. The pipe 280 extends between a first end 281 and 282. A first end portion 283 is received within the socket 82 of the fitting 250 and butts up against the associated centralizer arms (e.g., opposite the tips of the feet). A second end portion 284 is received within the second end portion 120 of the closure coupling 100. The closure coupling first end portion 116 receives the outer member end portion 118 at the first interface of the second fitting 252.

Figure 9:
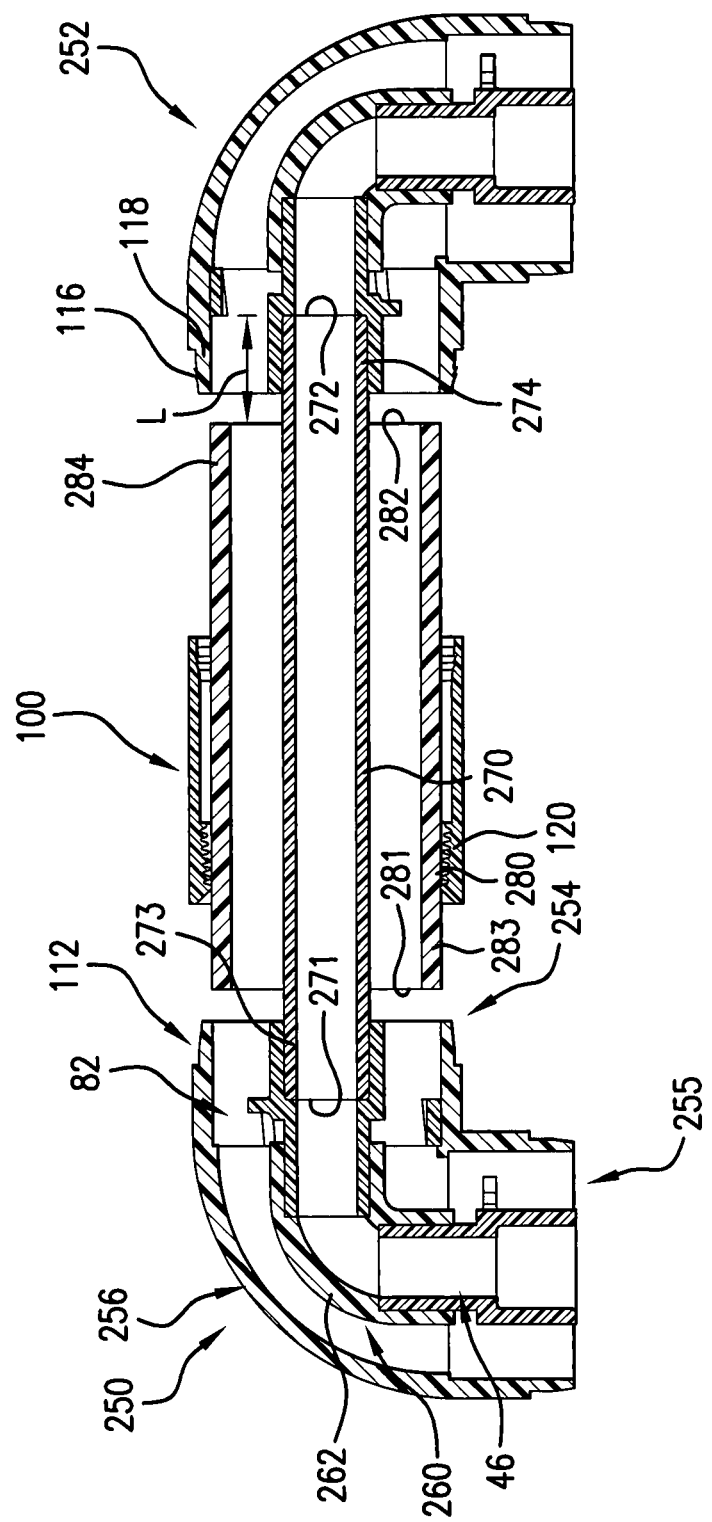
FIG. 9 is an axial sectional view of the fittings of FIG. 8 in an earlier stage of assembly.
Figure 10:
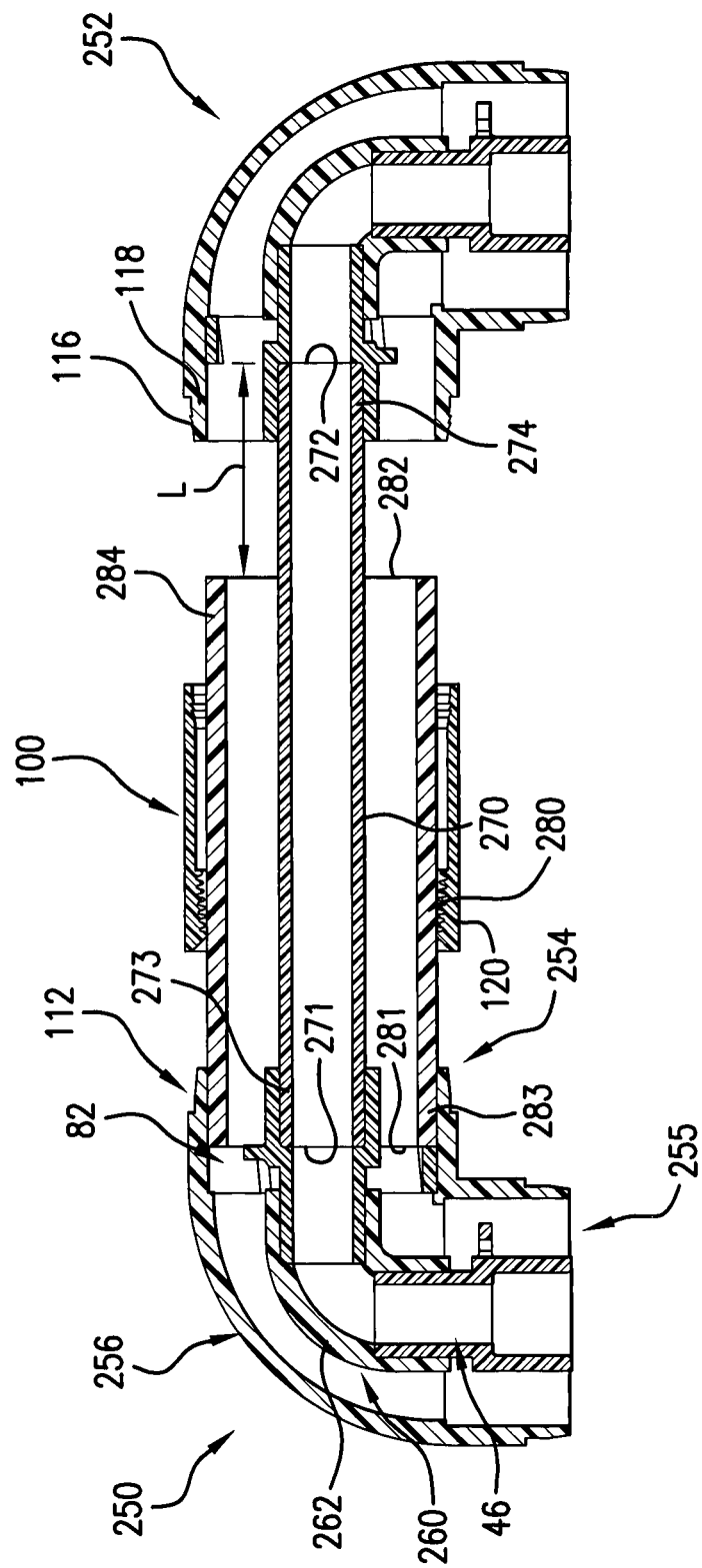
FIG. 10 is a view of the fittings of FIG. 8 in an intermediate stage of assembly.

An exemplary sequence of installation involving a situation where a closure coupling 100 mates the containment pipe to a fitting is described relative to this FIG. 8 embodiment but is applicable to other embodiments. The particular situation described involves the absence of a closure coupling at the other end (although other combinations are possible). The closure coupling 100 is assembled over the outer pipe 280 and their combination may be assembled over the inner pipe 270. Solvent cement may be applied to the outer surface of the inner pipe at the end portions 273 and 274 and/or to the terminal piece sockets that receive those end portions. The inner pipe end portions 273 and 274 are then inserted into the mating sockets (FIG. 9) to establish the inner (main) pipe joints (as in a conventional joining technique). Alternatively, one of the end portions may first be assembled and bonded to its associated socket and, thereafter, the outer pipe and closure coupling may be placed over the inner pipe and the second end installed and bonded. After such securing of the inner pipe, there may be pressure testing with visual inspection. The exemplary outer pipe 280 is of a length sufficiently short that the inner/main pipe joints may be visually inspected. The exemplary outer pipe 280 is shorter than the gap between adjacent outer member rims. Even if only slightly longer than the gap, if the outer member is inserted into the mating socket of one of the fittings, the inner joint with the other fitting may be visually inspected. After any such inspection, the first end portion 283 may be secured to the associated fitting (FIG. 10). Again, this may be done by the conventional technique. Thereafter, if the closure coupling 100 is present it may be used to complete the connection to the fitting 252. Specifically, the closure coupling is slid back or retracted sufficiently to expose the second end portion 284. The solvent cement and, optionally, any primer may be applied to the outer surface of the pipe 280 at the end portion 284 and to the outer surface of the fitting at the rebate 112. Thereafter, the closure coupling may be slid into the installed FIG. 8 configuration to form the outer joint. It is during this sliding that the inner surface geometry of the closure coupling and the geometry of the rebate come into play. The other outer joints may be formed in similar ways and/or formed by direct insertion of the containment pipe into the fitting as discussed above.

At each connection interface, the outer surface of the outer member 42 includes a cutting guide indicia 210 (FIG. 7). The exemplary cutting guide indicia is essentially at the longitudinal position of the shoulder 156 (FIG. 1). The exemplary indicia 210 is an annular groove molded into the outer surface (although ribs, arrows or other indicia are possible). The indicia 210 may come into play in several ways to guide cutting of one or both of the main pipe and containment pipe to be mated to that interface. A first group of situations are those where there is direct connection of the containment pipe to the fitting (i.e., in the absence of a closure coupling). In these situations, the indicia 210 is aligned with the ultimate positions of the ends of the pipes. Exemplary main and containment pipe are co-delivered already assembled (e.g., in long lengths with an array of conventional centralizers in between). In a first exemplary situation, the pipes are to directly connect to associated fittings at both ends. In an example of this situation, the two fittings are put in the predetermined position and an end of the combined pipe assembly is aligned with the indicia 210 of one of the mating interfaces. The indicia 210 of the other of the mating interfaces is used as a guide to through-cut both pipes. The pipes end up as the correct length. To assemble, however, the inner and outer pipe may be translated (e.g., slid) longitudinally relative to each other to the positions discussed above for at least the joints at the first interface. In situations where one or two closure couplings are used, a similar cutting of the pipe assembly may first be made. This, at least, forms the main pipe in the correct length. The containment pipe is then trimmed back by a predetermined distance associated with the particular diameter of containment pipe and the closure coupling to be used. For example, a given predetermined distance may be removed if there is to be a closure coupling at only one end; whereas, twice said predetermined distance may be trimmed if there are to be such couplings at both ends.

Figure 11:
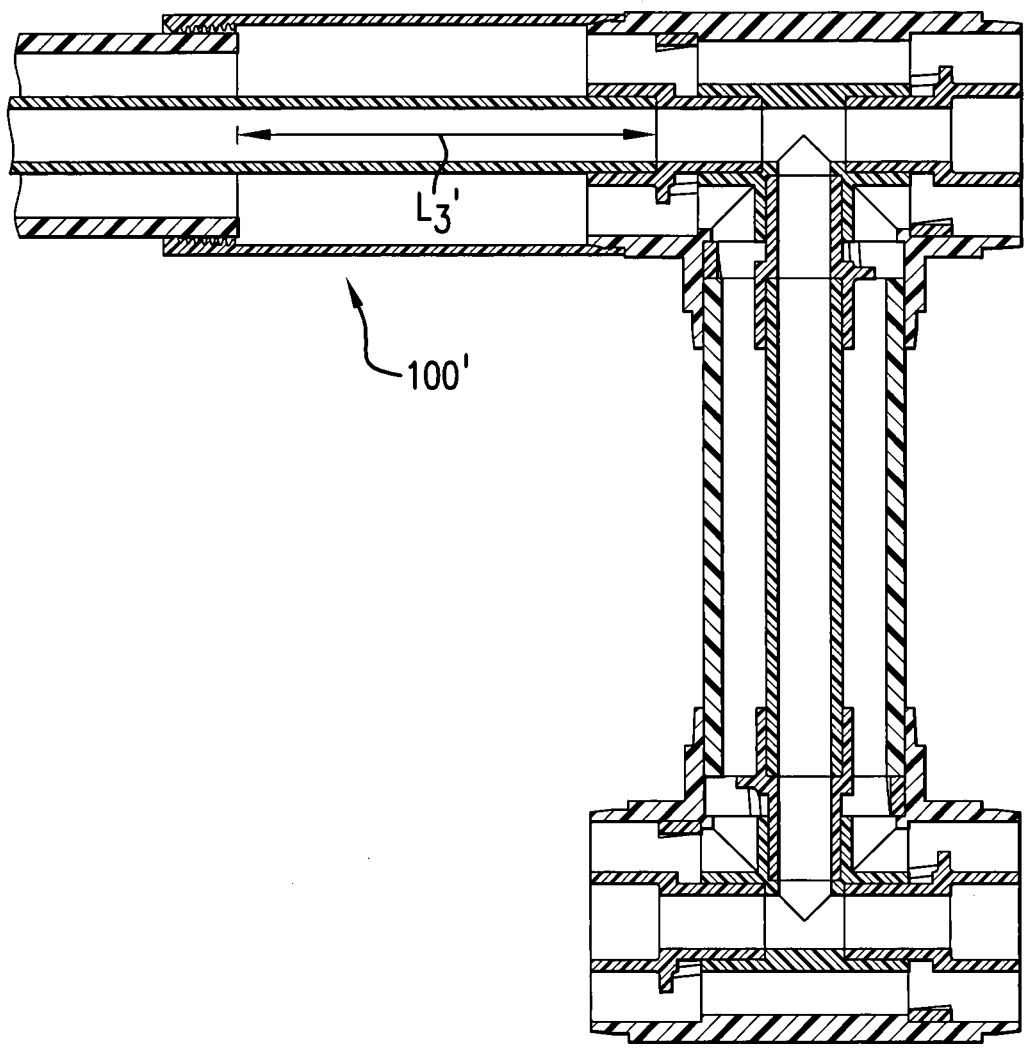
FIG. 11 is an axial sectional view of a pair of tee fittings in a piping system.

FIG. 11 shows an alternate system wherein two tee fittings are connected at their third connection interfaces using only a pipe (and not a closure coupling 100) at the outer containment conduit. The rims of the pipe abut the associated centralizers. FIG. 11 also shows a relatively long closure coupling 100'. The use of closure couplings of different lengths may have several uses. One situation involves use of the relatively long coupling 100' in a retrofit situation. For example, there may be an existing line (i.e., a main pipe within a containment pipe) into which one wishes to patch a tee fitting. One may start by cutting the pipe at two locations spaced apart by the required distance between rims 53 of the main pipe segments. If the rims 52 of the containment pipe segments are merely cut back by the normal offset $L_3$, there may be less than desirable clearance to secure the main pipe. Use of a longer closure coupling allows a greater offset/stagger $L'_3$.

Exemplary pipes and fittings are thermoplastic such as a vinyl (e.g., PVC or CPVC) such as schedule 40 PVC. These may be opaque (e.g., white or colored) or transparent. Even where other components are opaque, the closure couplings may transparent to permit inspection (e.g., allowing users to see evidence of internal leaks). Such transparency also allows observation of adequate cementing between the closure coupling and both the outer member and the pipe.

One or more embodiments of the present invention have been described. Nevertheless, it will be understood that various modifications may be made without departing from the spirit and scope of the invention. For example, a variety of existing types of fitting may be implemented using the present technology. Accordingly, other embodiments are within the scope of the following claims.

What is claimed is:
1. A centralizer (46) for a containment piping system, the centralizer comprising a single molded piece formed of PVC or CPVC comprising:
   a molded socket adapter (49) having a first rim (54) at a first end and a second rim (150) at a second end;
   an inner surface (73) extending between the first and second ends;
   an outer surface (154) extending between the first and second ends; and
   a plurality of centralizer arms (48) extending radially outward from the socket adapter, wherein:
   the centralizer arms have free distal ends;
   the centralizer arms spiral and have longitudinally protruding end portions (184);
   the inner surface defines a socket (72) extending from the first rim and having a socket inner diameter ($D_5$); and
   a portion of the socket adapter extending from the second rim has an outer diameter ($D_{10}$) which is nominally the same as that of a pipe dimensioned to mate with the socket.

2. The centralizer of claim 1 wherein:
   the arms have sufficient flexibility to provide three linear degrees of excursion plus pitch and yaw rotation.

3. A centralizer (46) for a containment piping system, the centralizer comprising a single molded piece formed of PVC or CPVC comprising:
   a molded socket adapter (49) having a first rim (54) at a first end and a second rim (150) at a second end;
   an inner surface (73) extending between the first and second ends;
   an outer surface (154) extending between the first and second ends; and
   a plurality of centralizer arms (48) extending radially outward from the socket adapter, wherein:
   the centralizer arms have free distal ends;
   the centralizer arms spiral and have longitudinally protruding end portions (184);
   the inner surface defines a socket (72) extending from the first rim and having a socket inner diameter ($D_5$);

along the socket, the outer surface has a socket outer diameter ($D_{12}$);

along a portion between the second rim and the socket, the inner surface has a second inner diameter ($D_{11}$) less than the socket inner diameter; and along a portion extending from the second end, the outer surface is radially recessed with a second outer diameter ($D_{10}$) less than the socket outer diameter.

4. A centralizer (46) for a containment piping system, the centralizer comprising a single molded piece of PVC or CPVC comprising:

a molded main body (49) having a first rim (54) at a first end and a second rim (150) at a second end;

an inner surface (73) extending between the first and second ends;

an outer surface (154) extending between the first and second ends; and a plurality of arms (48) extending radially outward from the main body, wherein:

the inner surface defines a socket (72) extending from the first rim and having a socket inner diameter (D5);

a portion of the main body extending from the second rim has an outer surface dimensioned to allow mating with a socket of the same dimensions to said socket; and the arms spiral and have free distal longitudinally protruding end portions (184) unitarily molded with the arms.

* * * * *